US012347612B2

(12) United States Patent
Markiewicz et al.

(10) Patent No.: US 12,347,612 B2
(45) Date of Patent: Jul. 1, 2025

(54) SYMMETRIC QUENCH PROTECTION OF RESISTIVE INSULATION COILS

(71) Applicant: Florida State University Research Foundation, Inc., Tallahassee, FL (US)

(72) Inventors: William Denis Markiewicz, Ipswich, MA (US); Mark D. Bird, Tallahassee, FL (US); Iain R. Dixon, Tallahassee, FL (US); William Scott Marshall, Tallahassee, FL (US); Thomas A. Painter, Tallahassee, FL (US); Peng Xu, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 281 days.

(21) Appl. No.: 18/122,276

(22) Filed: Mar. 16, 2023

(65) Prior Publication Data

US 2023/0298790 A1 Sep. 21, 2023

Related U.S. Application Data

(60) Provisional application No. 63/320,423, filed on Mar. 16, 2022.

(51) Int. Cl.
*H01F 6/02* (2006.01)
*H01F 6/06* (2006.01)

(52) U.S. Cl.
CPC .................................... *H01F 6/02* (2013.01); *H01F 6/06* (2013.01)

(58) Field of Classification Search
CPC ... H01F 6/02; H01F 6/06; H01F 6/008; H01F 6/065; G01R 33/035; G01R 33/44; H02H 7/00
USPC .......................................................... 361/19
See application file for complete search history.

(56) References Cited

U.S. PATENT DOCUMENTS 4,559,576 A * 12/1985 Ries ........................ H01F 6/006 335/216
5,278,380 A 1/1994 Lowry
6,735,848 B1 * 5/2004 Markiewicz .......... H01F 41/048 29/605
8,072,301 B2 12/2011 Timinger
10,984,934 B2 4/2021 Markiewicz et al.
2010/0056378 A1 * 3/2010 Timinger ........... G01R 33/3815 324/322
2011/0082043 A1 * 4/2011 Wang ........................ H01F 6/06 324/318
2016/0268028 A1 * 9/2016 Miyazoe ................. H01F 6/065
2020/0091702 A1 * 3/2020 Noonan .................... H01F 6/02

* cited by examiner

*Primary Examiner* — Danny Nguyen
(74) *Attorney, Agent, or Firm* — Fox Rothschild LLP

(57) ABSTRACT

A magnet includes a stack of a plurality of superconducting pancake wound coils having a stacking axis normal to a winding direction of the coils. The stack has axial ends and has a stack midplane relative to the stacking axis. A quench detector is provided for detecting a quench in the stack of superconducting pancake wound coils. A plurality of resistance quench heaters (RQH) are distributed symmetrically along the axis with respect to the stack midplane. Control circuitry is provided for controlling the operation of the RQH upon the detection of a quench by the quench detector. A method of quenching a magnet is also disclosed.

33 Claims, 8 Drawing Sheets

SYMMETRIC QUENCH PROTECTION OF RESISTIVE INSULATION COILS

CROSS-REFERENCE TO RELATED APPLICATIONS

This application claims priority to U.S. 63/320,423 filed on Mar. 16, 2022, entitled "SYMMETRIC QUENCH INITIATION FOR QUENCH FORCE REDUCTION", the entire disclosure of which incorporated herein by reference.

STATEMENT REGARDING FEDERALLY SPONSORED RESEARCH AND DEVELOPMENT

This invention was made with government support under Contract No. DMR-1644779, DMR-1938789 and DMR-2131790 awarded by the National Science Foundation. The government has certain rights in this invention.

FIELD OF THE INVENTION

The present invention relates generally to quench protection systems and methods for superconducting coils, and more particularly to magnets incorporating such superconducting coils.

BACKGROUND OF THE INVENTION

The present invention relates to the quench protection of superconducting coils. A quench of a superconductor is a transition from the superconducting to the normal resistive electrical state. A quench of a superconducting coil can be a local spontaneous quench of the conductor due to exceeding operational limits or a local failure of the conductor. A magnet has stored energy. The normal region associated with a quench results in energy dissipation in that region. If the region is small, the energy density deposited in the region can be large and can result in damage to the coil. Therefore it is a common practice in the event of a quench to take measures to ensure that an initial small spontaneous quench region is spread and extended to include a larger volume of the coil. When coils are very small and the total energy is low, this intervention is not required and the coils are called self-protecting. When coils are larger it is common practice to employ active protection, which includes a means to detect a quench, such as a voltage measurement, and if a quench is detected, a means to broaden the quench region within the coil for the purpose of creating a rapid current decay and thereby limiting the heating at the initial quench zone. A conventional method to spread a quench region is to use resistive heaters attached to the windings. In the event of a quench, the heaters are activated and cause secondary quench zones to develop, thereby spreading the quench and causing a rapid current decay.

A recent development in superconducting magnets is the use of No Insulation (NI) technology with High Temperature Superconductor (HTS) including REBCO tape conductors. A generalization of NI technology is Resistive Insulation (RI) coils where a low contact resistance between turns can be obtained in a variety of ways including Metallic Insulation, and Partial Insulation. A principal characteristic of NI/RI coils is that a local spontaneous quench zone develops into a quench avalanche that quickly spreads the quench throughout the coil. As a result, even relatively large NI/RI single coils are self-protecting. But an aspect that is not widely recognized is that in magnets containing multiple NI/RI coils, either alone or in combination with outer Low Temperature Superconducting (LTS) coils, the quench of an individual NI/RI coil is accompanied by an axial force that is estimated to be sufficiently large as to cause structural damage. Quench in a NI/RI coil has been analyzed extensively. In the early stage of a quench, after a localized normal region has developed, the finite contact resistance between turns allows a radial bypass current to exist in addition to the usual circumferential operating current. The situation is dramatically different in the later stages of quench where there is rapid quench propagation within a disk and from disk to disk. At the quench front, there is a rapid change of circumferential current to radial current in a disk. It is the circumferential current that is the source of the magnetic field in a coil, and the interaction of the circumferential current with the magnetic field is the source of axial forces in a coil. During normal operation, there are large axial forces within each coil, but because the coils are axially aligned there are no net axial forces between coils. During a quench of an NI/RI coil, with the decay of the circumferential current in the regions that have quenched, the magnetic center of the quenching coil is shifted, and the offset of the magnetic centers results in large axial forces between coils, which can damage the coil assembly.

A solution to the problem of large axial quench force in multi-coil NI/RI magnets was the subject of U.S. Pat. No. 10,984,934, "FAST INDUCTIVE HEATERS FOR ACTIVE QUENCH PROTECTION OF SUPERCONDUCTING COIL," the disclosure of which is hereby incorporated fully by reference. The quench force was understood to be the result of a shift of the magnetic center of the quenching coil. It was realized that the axial quench force could be diminished by the extent to which the quench could be made symmetric in all the coils of an NI/RI coil set. The method identified to make the quench symmetric was to impose a symmetric quench of all the NI/RI coils quickly before the initial spontaneous quench became too large.

SUMMARY OF THE INVENTION

A magnet includes a stack of a plurality of superconducting pancake wound coils having an axis normal to a winding direction of the coils. The stack has axial ends and having a stack midplane relative to the axis. A quench detector is provided for detecting a quench in the stack of superconducting pancake wound coils. A plurality of resistance quench heaters (RQH) are distributed symmetrically along the axis with respect to the stack midplane. Control circuitry is provided for controlling the operation of the RQH upon the detection of a quench by the quench detector. The superconducting pancake wound coils can be no insulation resistive insulation (NI/RI) coils.

The magnet can further include a quench initiation coil (QIC) at each axial end of the stack. The QIC can be pancake wound. The QIC can have an operating current within ±30% of the operating current of the superconducting pancake wound coils. The inductance of the QIC can be within ±50% of the inductance of an adjacent superconducting pancake wound coil at the end of the coil stack.

The RQH can include insulation. The insulation can be Kapton®, G10 or other insulation. The RQH can include high thermal conductivity electrical insulation to facilitate transfer of heat from the heater element.

The magnet can include a power supply to drive at least one selected of a RQH and a QIC. The magnet can include an external dump resistor and circuit with a switch. The magnet can also include a processor for controlling, responsive to an input from the quench detector, at least one of an RQH, a QIC and a switch for external discharge.

The magnet can include at least first and second pairs of RQH. Each pair can include first and second RQH symmetrically distributed with respect to the stack midplane, with at least one superconducting pancake wound coil between the first RQH of the first pair and the first RQH of the second pair. At least one superconducting pancake wound coil can be between the second RQH of the first pair and the second RQH of the second pair. The symmetric distribution of groups of RQH are between adjacent pairs of superconducting pancake wound coils. The RQH can have at least one superconducting pancake wound coil positioned between the RQH and the axial ends of the stack.

A method is provided for quenching a magnet comprising a stack of a plurality of superconducting pancake wound coils having an axis normal to a winding direction of the coils. The stack has axial ends and having a stack midplane relative to the axis. The method includes the steps of providing a quench detector for detecting a quench in the stack of superconducting coils, and providing a plurality of resistance quench heaters (RQH) distributed within the stack symmetrically along the axis with respect to the stack midplane. A quench is detected with the quench detector. Control circuitry is used to control the operation of the RQH upon the detection of the quench by the quench detector to symmetrically quench the stack of a plurality of superconducting pancake wound coils relative to the stack midplane.

The method can further comprising the step of, after detection of a quench by the quench detector, using control circuitry to open an external discharge switch to direct current from the stack of a plurality of superconducting pancake wound coils through an external discharge circuit and dump resistor. The method can use control circuitry to activate a power supply for at least one selected from the group consisting of the RQH and a QIC.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
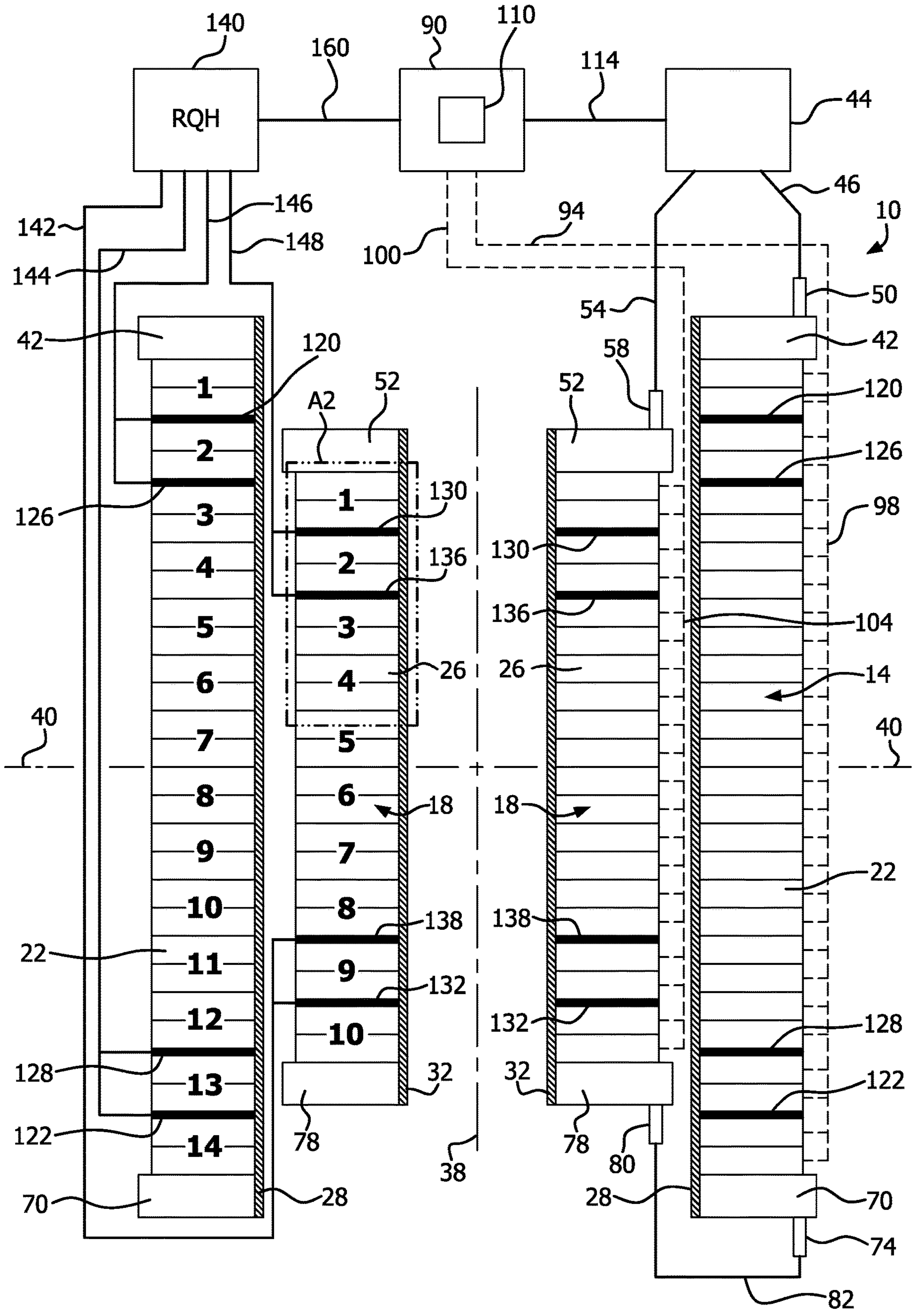
FIG. 1 is a schematic cross section of a superconducting magnet showing the location of resistive quench heaters (RQH) shown as dark lines placed between pancake wound double coils.

A magnet according to the invention includes a stack of a plurality of superconducting pancake wound coils having a stacking axis normal to a winding direction of the coils. The stack has axial ends and has a stack midplane relative to the stacking axis. A quench detector is provided for detecting a quench in the stack of superconducting pancake wound coils. A plurality of resistance quench heaters (RQH) are distributed symmetrically along the axis with respect to the stack midplane. Control circuitry is provided for controlling the operation of the RQH upon the detection of a quench by the quench detector.

In the symmetric distribution of the RQH, there are corresponding pairs of RQH. Corresponding RQH are individual pairs of RQH that occupy symmetric positions with respect to the coil midplane. In order to maintain symmetry of the induced quench, it is important that corresponding RQH operate in the same manner with respect to timing and power to create a symmetric quench. For this to be the case, corresponding RQH are wired in series in the heater circuit. It is possible for a series leg of the overall RQH circuit to contain a single corresponding pair of RQH. It is also possible for a series leg of the circuit to contain more than one corresponding pair of RQH.

The RQH can be comprised of high thermal conductivity electrical insulation to facilitate transfer of heat from the heater element. Resistive quench heaters (RQH) consisting of a thin resistive strip between thin layers of insulation are suitable for placement between the disks of a tape wound REBCO HTS coil. In this way, the RQH can readily be distributed in any symmetric pattern in any location throughout a coil including a concentration in the end portions of the coil.

In a multi-coil magnet, the choice of RQH design is related to the overall circuit used to power the RQH. As has been described, it is important for the purpose of maintaining symmetry to have corresponding RQH in series. By definition, those RQH are on the same coil and powered by the same source. For a multi-coil set, it is possible to have the same RQH power source for all coils. Alternatively, there can be different power sources for the RQH on different coils. In that case, the resistance of the RQH associated with each power source is independent. But when there is a single power source for a number of coils, the requirement of uniform power dissipation among the RQH gives rise to constraints in the circuit, including the relative resistance among the various RQH. The resistance of a RQH is related to the radial size of a coil, the RQH trace width, the number of traces in the RQH, and the trace pattern. All of these factors go into the design of RQH for a set of coils. A RQH assembly consists of a number of layers including the resistive heater element itself, and typically a number of layers of insulation on both sides of the heater element. A resistive heater element can be a thin stainless steel strip or other resistive conductor, in the range of, but not limited to, 25 to 100 micrometers thick.

Insulation layers that have been used include Kapton® (E.I. du Pont de Nemours and Company) and G10. Insulations that are thin and have high thermal conductivity such as diamond like carbon, aluminum oxide, and other materials are advantageous for the speed of operation of the heater, but offer challenges to be applied in a manner with high electrical insulation strength. RQH assemblies consisting of a central thin heater element between layers of Kapton and G10 with an overall thickness in the range of 400 micrometers have been found to be sufficiently fast in thermal performance Other types of heaters are possible. The invention includes the use of quench heaters of any type that are symmetrically distributed within the stack and about the midplane, and are capable of producing a quench in an NI/RI coil relatively quickly in a time of from 50 to 100 milliseconds, or less.

The superconducting coils can be no insulation resistive insulation (NI/RI) coils. The invention is useful with different kinds of superconducting coils. The superconducting coil can be pancake wound. The superconducting coil can be layer wound. The superconducting coil can be a no insulation (NI) coil. The superconducting coil can include a rare earth barium copper oxide (ReBCO) superconducting material. Other superconducting materials are possible. The superconductor may range from wire to flat tape.

The positions of the RQH in the coil stacks can vary, so long as they are provided as pairs symmetrically distributed with reference to the stack midplane. For each pair of RQH, there is an upper heater above the midplane and a lower heater symmetrically below the midplane. In the case of two pair of RQH, the heaters are most efficient in initiating a quench when there is a single double pancake coil between the upper heaters of the pair, and likewise for the lower heaters. In that case, the two upper heaters are both adjacent to and heat the double pancake between them, and the same is true for the lower heaters. The RQH are positioned between adjacent pairs of superconducting double pancake wound coils. There is at least one superconducting double pancake wound coil positioned between the RQH and the axial ends of the stack.

The present invention includes a symmetric distribution of quench heaters over a larger region of the windings than just at the ends of the coils. In principle, the greater the extent of the distribution of heaters, the more effective will be the heaters in limiting the axial quench force. In practical terms, it is advantageous to limit the number of RQH to the extent that is required to decrease the axial force to a manageable value within the mechanical design constraints.

The magnet can further include an external dump resistor and circuit. In addition to the use of symmetrically distributed RQH, another method for the protection of superconducting magnets is external discharge through a dump resistor. In this case, protection is obtained by the rapid decrease of operating current before overheating can occur. This method is primarily limited to large high current magnets. The required discharge voltage to achieve a rate of current decay is directly related to the operating current. For magnets with multi-thousand ampere operating current, the discharge voltage is relatively low. For typical laboratory research magnets, with currents of several hundreds of amperes to 1000 amperes, the discharge voltage to achieve protection by operating current decay is excessively high. A detailed analysis of NI/RI coils under external discharge, however, reveals a different quench protection mechanism. In an insulated coil, the only current path is the circumferential current. During a rapid discharge, the circumferential current decreases uniformly throughout the coil. In a NI/RI coil, the lack of full turn to turn insulation allows a radial current component. During a rapid discharge of an NI/RI coil, it is observed in calculations that there is a large induced radial current throughout the entire coil. The radial current, flowing through the radial resistance that is present in the coil, produces heating and that heating facilitates the production of quench in the coil. Because of the symmetry of the stacking of the coils in a multi-coil magnet, the quench induced or facilitated by external discharge is inherently symmetric about the magnet midplane. In this way, the condition of symmetry for symmetric quench is met by external discharge.

Another condition for symmetric quench to result in reduced axial force is that the quench must occur rapidly to preserve as much symmetry as possible given the initial spontaneous quench. In the case of external discharge, the speed of the development of the quench is a function of the rate of discharge, which in turn depends on the voltage of the discharge. Given limitations on practical voltages, which in some cases are 1000 V or less, there are limitations to the amount of axial force reduction that is obtained from external discharge. A very natural system is to employ external discharge in combination with a distribution of RQH. In particular, since the external discharge typically operates to create a quench in the end most disks because of the low critical currents, a distribution of RQH somewhat displaced toward the coil midplane has the effect of extending the volume of the windings that is being quenched. The result of a larger initial quench region is a decrease in axial force. The combination of RQH and external discharge results in the lowest residual axial force. In addition, having two independent systems provides redundancy. If either the RQH or the external discharge were to fail, the forces for the one system alone are higher but not catastrophically so.

The quench detector can vary. The quench detector can communicate with sensors on the coils to detect voltage changes that indicate a quench. The quench detector can be at least one selected from the group that utilizes voltage sensors, optical sensors, and/or electromagnetic field sensors. The quench detector can include voltage taps for detecting the voltage drop between at least two positions of the superconducting coil.

The magnet can further include a power supply to drive the RQH and/or QIC. The RQH and/or QIC power supply can be any power supply appropriate for the type of heater being used. The present embodiment can include as quench heaters a quench initiation coil (QIC) and resistive quench heaters (RQH). The present embodiment can include a capacitor and switch as a power source. Power supplies that contain both capacitive and inductive circuit elements giving longer pulse times can also be included.

It is possible that all of the RQH in a circuit are wired in series. In this case there is no redundancy of RQH for a failure of the circuit. It is preferable for the RQH circuit to have a number of parallel paths, where each parallel path has a series combination of corresponding RQH. In that case, if there is an interruption of one of the parallel paths, the remaining paths remain operational, and each leg functions to produce a symmetric quench.

The design of the RQH is an important aspect of the proposed active protection system. The RQH heating element can be formed from a thin sheet of resistive conductor, typically but not exclusively stainless steel or nichrome, and is situated between disks or pancakes of a pancake wound coil. The coil is cylindrical in shape with an inner and outer radius. A heater element pattern consisting of a single wide strip heater element in an arc segment on the surface of a disk would require high current. Furthermore, the current in the single wide heater strip would tend to accumulate at the inner radius with resulting undesirable non-uniform heating. Instead, the heater element is configured as a filament or trace of a give width formed in a pattern on the area provided between disks. The pattern can have radially directed segments as has been used previously. The trace patterns can include largely circumferential directed segments.

A pancake coil has an inside radius and an outside radius. The number of circumferentially oriented heater traces that can be placed on the surface depends on the pancake coil radial depth, which forms the space available, and the trace width and gap between traces which fill the available space. A typical trace width is in the range of 5 mm can be 3 mm, 4 mm, or 5 mm. For a smaller gap, or separation distance between traces, a larger number of circumferentially oriented traces can fit in a given radial space. But a small gap is associated with a small radius at the turn around between adjacent traces. The heater current distribution is not uniform at the turn around and tends to accumulate at the inside radius, resulting in increased heating at the turn around in compared to the heating in the circumferential sections. It is desired to have a high level of heating in the bulk of the RQH, in the circumferential sections, in order to achieve a fast response time of the RQH. The heating at the turn around can be significantly greater than in the circumferential sections so as to result in damage to the windings unless limited. The ratio of heating at the turn around to the heating at the circumferential section is directly related to the inside radius of the trace at the turn around. A smaller radius results in a larger heating ratio. The heating at the turn-around is therefore limited by making the turn-around radius sufficiently large. This requires radial space and limits the number of traces that can be fit onto a coil of given radial depth. In order to limit the excess heating at the turn-around portion of the trace, a turn-around radius of 3 to 4 mm at a minimum has been found to be desirable for a trace width of 5 mm.

A method is provided for quenching a magnet comprising a stack of a plurality of superconducting pancake wound coils having an axis normal to a winding direction of the coils, where the stack has axial ends and has a stack midplane relative to the axis. The method includes the step of providing a quench detector for detecting a quench in the stack of superconducting coils, and providing a plurality of resistance quench heaters (RQH) distributed symmetrically with respect to the stack midplane within the stack along the stack axis. A quench is detected with the quench detector. Control circuitry is used to control the operation of the RQH upon the detection of the quench by the quench detector to symmetrically quench the stack of a plurality of superconducting pancake wound coils relative to the stack midplane.

The method can also include the step of, after detection of a quench by the quench detector, using control circuitry to direct current from the stack of a plurality of superconducting pancake wound coils through an external discharge circuit and dump resistor.

Active quench protection is commonly used with large multi-coil LTS superconducting magnets. The active protection system typically consists of a quench detector, to measure an indication of quench, a signal processor to identify a quench condition and activate a means of intervention, and the means of intervention which is often a set of heaters to cause a general quench of the magnet. The objective of the system is typically to quench a large portion of a magnet and thereby decrease the operating current of the magnet sufficiently rapidly to avoid overheating of the initial quench zone or hotspot. Large axial forces are known to accompany quench in solenoid magnets containing multiple coils that include NI/RI coils. The source of the axial force is a result of the nature of quench in NI/RI coils and the asymmetry of a typical spontaneous quench with respect to the magnet midplane. The invention provides an active quench protection system that is configured to reduce the axial quench force in NI/RI coils by the superposition of an induced symmetric quench of all the NI/RI coils in the multiple coil set. In order to preserve overall symmetry and reduce the axial forces to the greatest extent possible, the induced symmetric quench must be initiated quickly before the initial asymmetric quench has time to develop and significantly propagate. In order to address this requirement, the RQH can be supplemented with a quench initiation coil (QIC) at each axial end of a stack. The QIC are pancake wound coils that are positioned at the end of the NI/RI coil stack. The QIC is used with a pulsed current, as for example results in the discharge of a capacitor current source. When the QIC is pulsed to high negative current, with respect to the polarity of the NI/RI coil windings, a large positive current is induced in the adjacent pancakes of the NI/RI coil by inductive coupling. This increased circumferential current can exceed the local critical current causing the end pancakes of the NI/RI coil to quench. Also, the increased circumferential current completes a current path by returning radially through the turns of the NI/RI windings to cause additional heating and quench.

In order to be most effective, the QIC should be of high inductance. The inductance of the QIC can be within ±50% of the inductance of an adjacent superconducting pancake wound coil at the end of the coil stack. The QIC can have an operating current within ±30% of the operating current of the superconducting pancake wound coils. The QIC can be pancake wound of copper tape, with a stainless steel co-wind tape, and can have turn insulation at a turns density and tape width that is comparable to that of the coil windings.

The quench onset process requires the creation of a fast-propagating quench in the NI/RI coil, and a substantial volume of initial quench zone is required. A single RQH at the very ends of the coils is not adequate to obtain the objective of a initiating a fast symmetric propagating quench regardless of how fast that heater is in quenching the end disk of the coil. The present invention provides a larger distribution of heaters arranged in a symmetric manner about the stack midplane and within the windings of a coil stack that is more. The invention provides for the possibility of three methods that can contribute to the formation of a symmetric quench condition. The RQH have significant role to play in formation of symmetric quench. The QIC can further participate in the quench. And third is the observation that rapid external discharge of NI/RI coils as through the dump resistor circuit leads to a symmetric quench condition.

The spontaneous quench of a coil can occur in a random location but is often near one end where the critical current properties are typically more limited. Such a spontaneous quench is non-symmetric with respect to the midplane and that asymmetry is the cause of the axial force. On the other hand, in the case where an imposed quench is induced simultaneously at the ends of all the coils in a set of NI/RI coil, the quench is inherently symmetric with respect to the midplane. In that case there are no axial quench forces. The method identified to reduce the axial forces associated with a spontaneous quench is the following. In the event of a spontaneous quench, an active protection system induces a symmetric quench at the ends of all NI/RI coils in the set. The superposition of the symmetric quench on the initial non-symmetric quench has the effect of making the situation more symmetric and reduces the axial quench forces. The proposed method works well when the imposed symmetric quench is applied relatively quickly before the asymmetry associated with the initial quench has developed too far. The QIC positioned at the ends of all coils in an NI/RI coil set can assist in rapid quench. The QIC acts very quickly to inductively quench the end most pancake that is adjacent to the QIC, but the quench of additional pancakes is not immediate. The RQH acts more slowly as determined by thermal diffusion of heat from the resistive heater element through the insulation layers and into the coil disk, but the distribution especially of a number of RQH results in a quench of relatively large volume of coil windings, and this is seen as important for the subsequent formation of the quench avalanche which is the objective.

Analysis has led to a better understanding of quench in NI/RI coils and a more detailed concept of how to reduce the axial quench force. It is now understood that the onset of the rapid quench propagation phase requires the buildup of a substantial initial quench zone in size and temperature, and that this build up requires a finite amount of time. This time is longer than was imagined previously and gives the opportunity to employ a broader range of quench heaters beyond the fast QIC. Furthermore, the volume of quench region to initiate fast quench propagation is greater than recognized previously, so that placement of a quench heater or QIC at the very end of a coil is less than optimal in creating a sizeable quench zone, and in some circumstances may be inadequate. In order to initiate a large quench zone, a distribution of RQH in the end portion of coils is now understood to be more effective. The broader range of RQH provides a characteristic time of operation as long as 50 to 100 milli-seconds as compared to the quench initiation coil (QIC) with a characteristic time of operation on the order of 10 milli-seconds. The QIC is placed at both ends of all coils in the coil set. The QIC is most appropriately placed at the very ends of coils beyond the actual length of the windings so as not to interfere with the turns density of the windings.

It has been found that while the action of a QIC can be very fast in quenching the end most disk of a magnet, the further development of the quench from a local condition at the end of a coil to a fast moving quench avalanche along the length of a coil can take a relatively long time. Therefore, it is not adequate to limit the extent of the distribution of quench heaters to the placement of a QIC at the very end of coils. Rather, in order to produce the desired fast quench propagation, a distribution of heaters of greater extent is required.

Because of the thickness of the QIC, it is most practical to place the QIC only at the coil ends. A resistive quench heater assembly can be made to be thin and is therefore capable of being placed between the modules, or double pancakes, of a pancake wound coil, in the space otherwise occupied by the insulating spacer, without major disruption to the distribution of conductor in the coil.

A larger induced symmetric quench in comparison to the initial spontaneous quench creates a total quench pattern of increased symmetry and therefore lower axial force. One the other hand, a design with a limited number of heaters is more practical in the required number of components, wiring and power requirements. In order to increase the efficiency of the heater system to produce a fast-propagating quench, a distribution of resistive quench heaters (RQH) in addition to the quench initiation coil (QIC) was studied. In order to limit the number of resistive heaters required, the heaters were distributed only toward the end portions of the superconducting coils. The resistive heater assembly is placed between two modules, or double pancakes, of the pancake wound coil. In order to increase the efficiency of the QIC at the coil end, resistive heaters were placed at the next nearest locations between modules. The effect of an additional 1, 2, or 3 resistive heaters on each end of each coil in a set of coils was examined.

It was found that the addition of a single RQH improved the performance of the QIC. While the QIC quickly results in a quench of the adjacent end disk, the RQH induces a quench in the next two adjacent disks to greatly increase the volume of the induced quench region and this in turn results in a more rapid development of the desired propagating quench avalanche. The number and extent of the resistive heaters was increased further to include a second resistive heater between the next adjacent modules. With two resistive heaters on each end of each coil in the set, the quench avalanche was again established significantly faster. The study was continued with three resistive heaters on each end of each coil. The improvement of the quench in going from two to three RQH was marginal.

Figure 2:
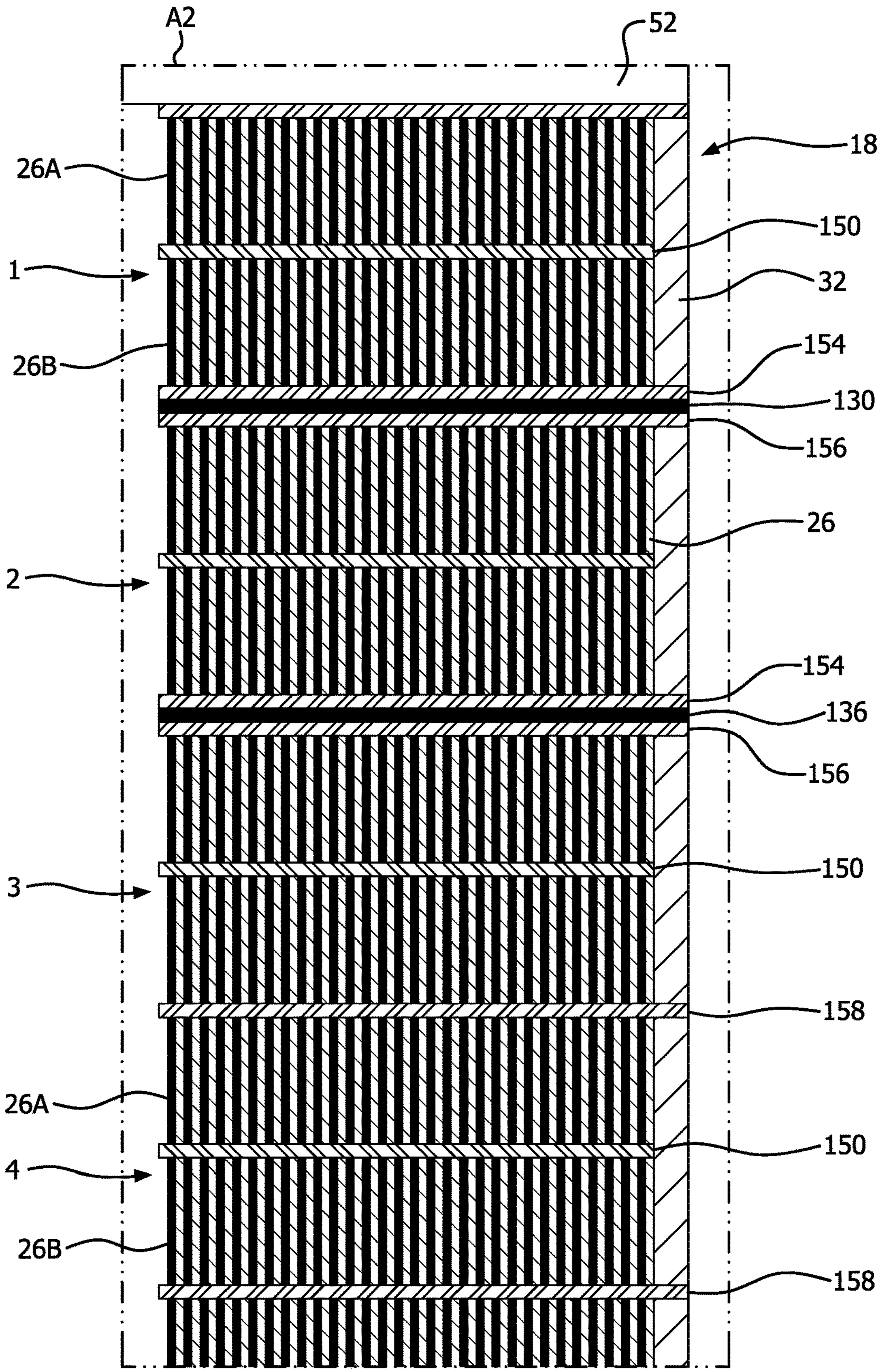
FIG. 2 is a magnified cross section of area A2 in FIG. 1.

As shown in FIGS. 1-2, a magnet 10 in one embodiment comprises a set of two nested pancake wound coil stacks such as outer stack 14 and inner stack 18. It should be appreciated that a single coil stack, or more than two stacks, are possible. The stacks are multi-coil with coils 22 in the outer stack 14 and coils 26 in the inner stack 18. The coils 22 and 26 can be comprised of High Temperature Superconductor (HTS) material, Low Temperature Superconductor (LTS) material, or other materials. The coils 22 and 26 can be the same or different in composition, size and design. The individual coils are typically provided as double pancake wound coils denoted by numerals 1-14 for the outer stack 14 and 1-10 for the inner stack 18. Resistive quench heaters (RQH) are placed between successive double pancakes toward the ends of the coils. The coils 22 of the outer stack 14 are placed about tubular mandrel 28 and the coils 26 of the inner stack 18 are placed about tubular mandrel 32. The coaxial coil stacks 14 and 18 define a coil axis 38 and share a common midplane 40. The coils are maintained by axial end brackets 42 and 70 for the outer stack 14, and 52 and 78 for the inner stack 18. A power supply 44 supplies power to the outer stack 14 through power connection 46 connecting to contact 50. The inner stack 18 receives power through a power connection 54 connecting to contact 58. Current flows between the outer stack 14 through a contact 74 to a contact 80 associated with the inner stack 18 through a connecting line 82.

A quench detector 90 having a signal line 94 connects to suitable quench sensors 98 associated with the outer stack 14. The quench detector 90 connects to quench sensors 104 associated with the inner stack 18 through a signal line 100. The quench detector 90 receives signals from the sensors 98 and 104 through respective signal lines 94 and 100. A processor 110 can be provided to interpret the signals and take appropriate action. The quench detector 90 can communicate with the power supply 44 through an appropriate connection 114.

In FIGS. 1-2, two cooperating pairs of RQH are shown for each of the outer stack 14 and the inner stack 18. More or fewer pairs of RQH can be provided. In the outer stack 14, the pair 120, 122 are equally distant from the midplane 40. The pair 126, 128 are equidistant from the midplane 40, and also closer to the midplane 40 than the pair 120, 122. Two cooperating pairs of RQH are also provided with the inner stack 18, such as the pair 130, 132 and the pair 136, 138. It can be seen that the position of the RQH associated with the inner stack 118 can be different from the position of the RQH associated with the outer stack 114.

Upon detection of a quench by the quench detector 90, a signal is sent to a RQH power supply 140 through a signal line 160. Power is transmitted from the RQH power supply 140 to the RQH 130, 132 and 136, 138 associated with the inner stack 18 through suitable power connections 142 and 148. Power is transmitted from the RQH power supply 140 to the RQH 120, 122 and 126, 128 associated with the outer stack 14 through suitable power connections 144, 146.

An expanded view of the area A2 is shown in FIG. 2. This figure shows the individual pancake coils 26 of the inner stack assembled as pairs 26A and 26B. The individual pancake coils 26A and 26B within a pair can be separated by electrical insulation 150. An RQH 130 is positioned between pancake coil pair 1 and pancake coil pair 2. The RQH 130 is separated from the pancake coils by electrical insulation 154, 156. The RQH 136 is positioned between pancake coil pair 2 and pancake coil pair 3. Electrical insulation 158 is positioned between adjacent pancake coil pairs, such as the electrical insulation 158 that is shown between pancake coil pair 3 and pancake coil pair 4.

Figure 3:
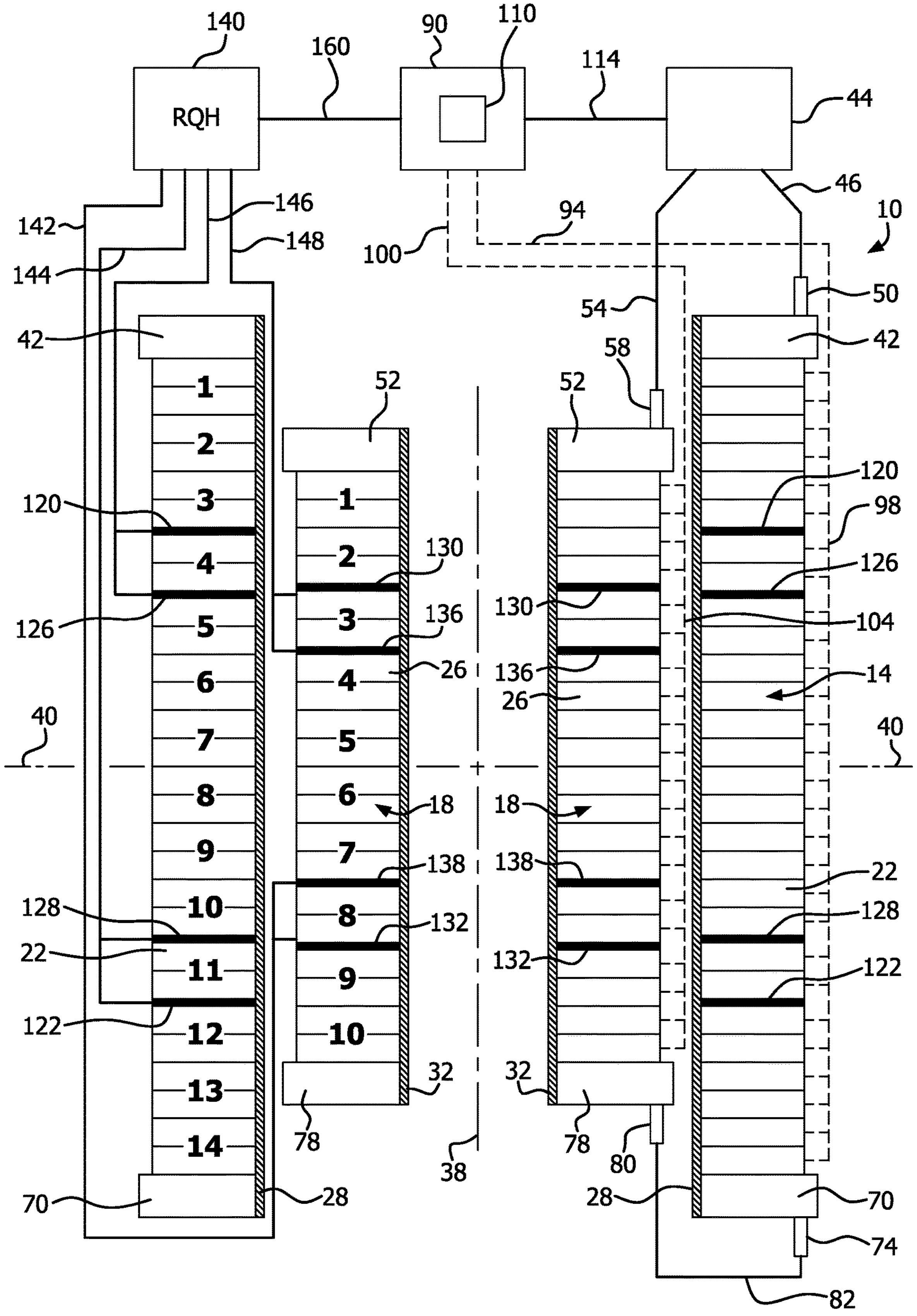
FIG. 3 is a schematic cross section of another embodiment of a superconducting magnet showing the RQH as dark lines placed between pancake wound double coils, at a different axial position in the superconducting coil stacks from the position shown in FIG. 1.

FIG. 3, where for ease of reference like numbers refer to like elements from FIG. 1, illustrates that the position of the RQH can vary, so long as the symmetric RQH pairs are symmetric about the midplane 40. In FIG. 3, the symmetric RQH are positioned further from the end flanges is 42 and 70 with respect to the outer stack 14, and further from the end flange is 52 and 78 with respect to the inner stack 18. Thus, the RQH 120 is here positioned between pancake coil pair 3 and 4 and its symmetrical RQH pair member 122 is positioned between pancake coil pair 11 and 12. RQH 126 is positioned between pancake coil pairs 4 and 5, while RQH 128 is between pancake coil pair 10 and 11. The RQH 130 is here positioned between pancake coil pair 2 and 3 and its symmetrical RQH pair member 132 is positioned between pancake coil pair 8 and 9. RQH 136 is positioned between pancake coil pairs 3 and 4, while RQH 138 is between pancake coil pair 8 and 9.

FIG. 3 shows the RQH again distributed in a symmetric manner about the midplane 40 of the coil stacks 14 and 18. The location of the RQH is shown for the embodiment in which the RQH are positioned approximately in the middle of each coil stack half above and below the midplane 40. The principal condition on the distribution of quench heaters is symmetry about the coil stack midplane, which includes distributions in which the heaters are closer to the midplane of a coil in addition to distributions in which the RQH are toward the two coil ends.

Figure 4:
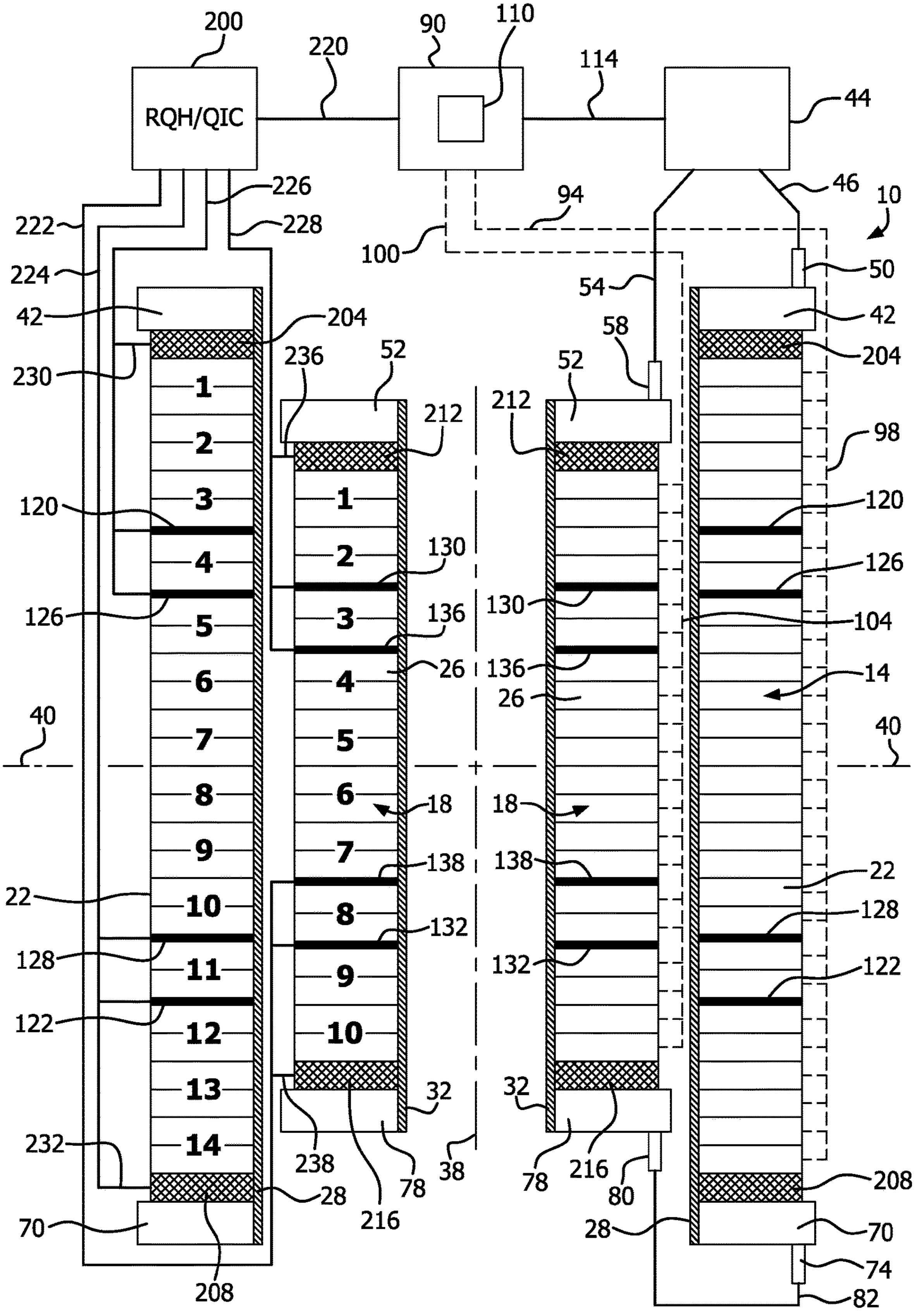
FIG. 4 is a schematic cross section of a superconducting magnet showing resistive quench heaters (RQH) as dark lines placed between pancake wound double coils and showing Quench initiation coils (QICs) at ends of the stacks of superconducting coils.

FIG. 4, where like numbers refer to like elements from FIG. 1, illustrates an embodiment with quench initiation coil (QIC) quench protection in addition to the RQH. A QIC 204 is placed at the axial end of the outer stack 14 adjacent the flange 42, and a QIC 208 is provided at the opposing axial end of the other stack 14 adjacent the flange 70. A QIC 212 is placed at the axial end of the inner stack 18 adjacent the flange 52 and another QIC 216 is placed at the opposing axial end of the inner stack 14 adjacent the flange 78. In this embodiment, a combined RQH/QIC power supply 200 is shown for ease of reference, however, it will be understood that separate power supplies for the RQH and the QIC are possible. In this embodiment, power from the power supply 200 is supplied through lines 222, 224, 226, and 228 and connects to the QIC through branch lines 230, 232, 236, and 238. Although these are shown as single lines, it will be appreciated that these lines could be separate lines from the RQH/QIC power supply to each of the RQH and the QIC. The power supply 200 receives a signal through connection 220 from the quench detector 90 and sends power to both the RQH and the QIC to quench the outer coil stack and the inner coil stack 18.

Figure 5:
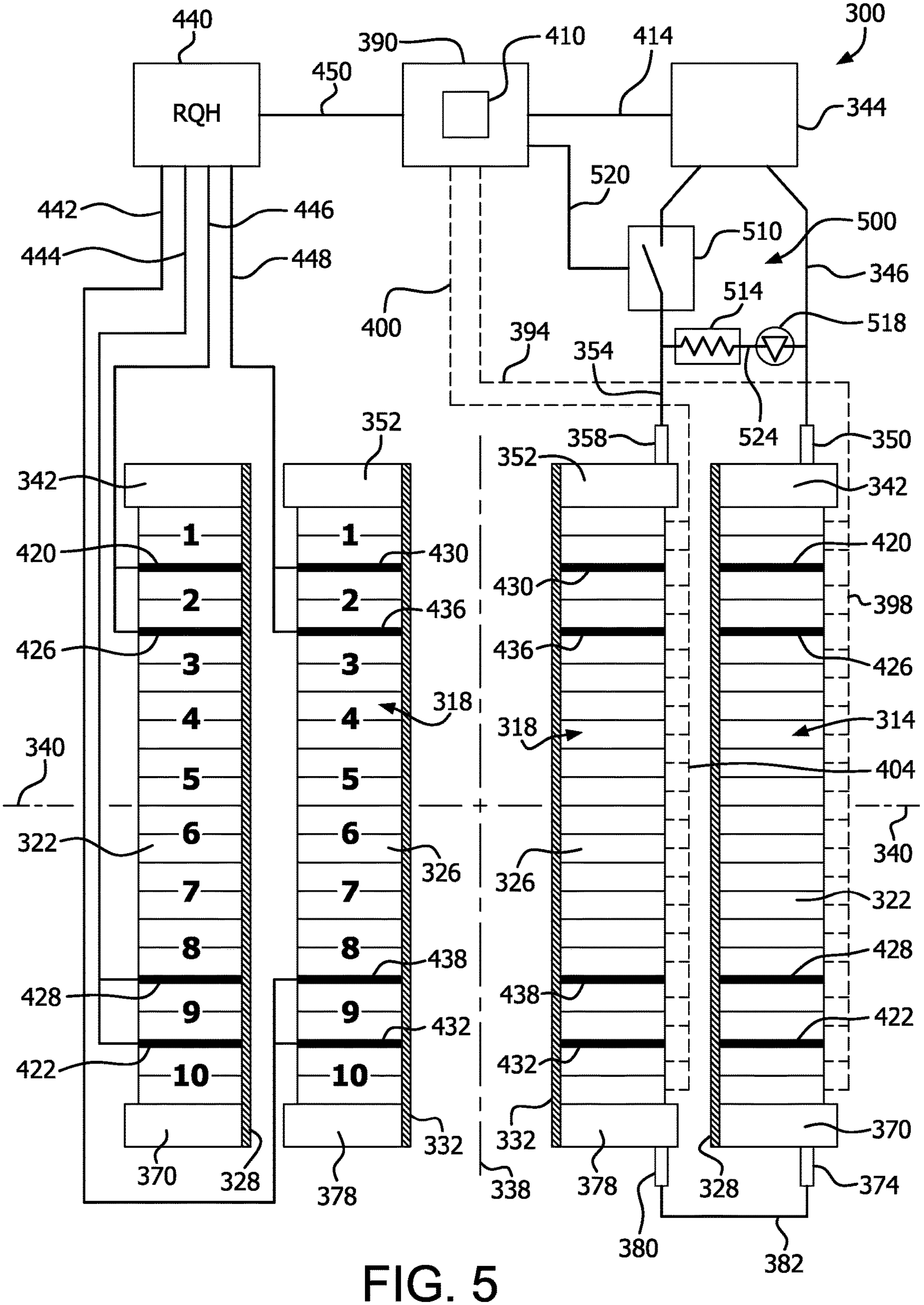
FIG. 5 is a schematic cross section of a superconducting magnet showing resistive quench heaters (RQH) as dark lines placed between pancake wound double superconducting coils and further showing a dump resister circuit.

There is shown in FIG. 5 an embodiment 300 with an inner coil stack 318 nested within an outer coil stack 314. The outer coil stack 314 is comprised of pancake coils 322, and the inner coil stack 318 is comprised of pancake coils 326. The outer coil stack 314 is provided on a mandrel 328, and the inner coil stack 318 is provided on a mandrel 332. The outer coil stack 314 and inner coil stack 318 define an axis 338 and a midplane 340. The outer coil stack 314 is positioned between axial end flanges 342 and 370, and the inner coil stack 318 is provided between axial end flanges 352 and 378. Current flows from the outer stack 314 through a contact 374 to a contact 380 associated with the inner coil stack 318 through a connecting line 382. A main coil power supply 344 is connected by power line 346 to contact 350 of the outer coil stack 314, and through connection 354 and contact 358 to the inner coil stack 318.

The magnet 300 also includes a quench detector 390 which communicates through a signal line 394 to quench sensors 398 associated with the outer coil stack 314, and through signal line 400 to quench sensors 404 associated with the inner coil stack 318. RQH symmetric pairs 420, 422 and 426, 428 are provided in the outer coil stack 314. RQH symmetric pairs 430, 432 and 436, 438 are provided in the inner coil stack 318. The RQH have a power supply 440 which communicates power to the RQH through connections 442, 444, 446 and 448. The quench detector 390 can have an associated processor 410 and both can receive power from the main coil power supply 344 through a connection 414. Upon detection of a quench, the quench detector 390 sends a signal through signal line 450 to the RQH power supply 440 to energize the RQH 420, 422 and 426, 428 in the outer coil stack 314, and the RQH 430, 432 and 436, 438 associated with the inner coil stack 318.

The magnet 300 further includes a dump resistor circuit 500. The dump resistor circuit 500 includes a switch 510 which communicates with the quench detector 390 through a signal line 520. A dump resistor 514 and diode 518 are provided in a branch circuit 524. In the event of a quench, the quench detector 390 sends a signal through signal line 520 to open the switch 510. Current flowing through the coils will be shunted through the resistor 514 and the diode 518 in the branch line 524.

Figure 6:
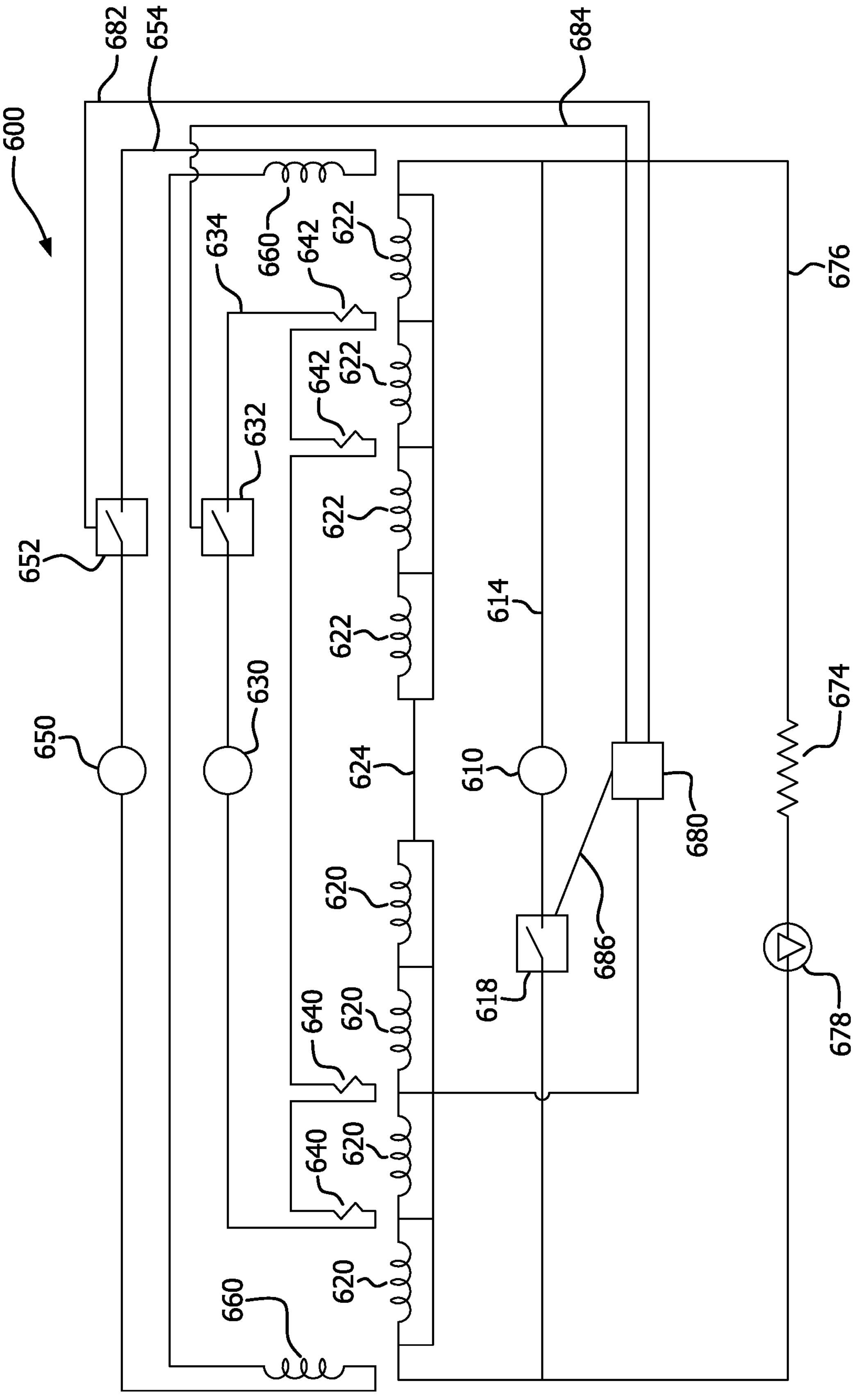
FIG. 6 is a circuit diagram of one example of a circuit suitable for the invention.

There is shown in FIG. 6 a circuit diagram according to the invention. Main power supply 610 supplies power through a connection 614 to pancake wound coils 620 and 622 connected through a line 624. A main power switch 618 is provided. An RQH power supply 630 is connected by line 634 with an RQH switch 632 and RQH 640 and 642. This branch of the circuit supplies power when the RQH switch 632 is closed to the RQH 640 and 642. A QIC power supply 650 is connected through a line 654 and a switch 652 to QIC 660. A dump resistor circuit is provided by a branch 676 and includes a dump resistor 674 and a diode 678. A quench detector 680 communicates through a line 686 to the main power switch 618. Upon detection of a quench by the quench detector 680, the main power switch 618 is opened and appropriate signals are sent to the RQH switch 632 through line 684 and QIC switch 652 through line 682. The opening of switch 618 will also cause main current to flow through the dump resistor 674 and diode 678.

Figure 7:
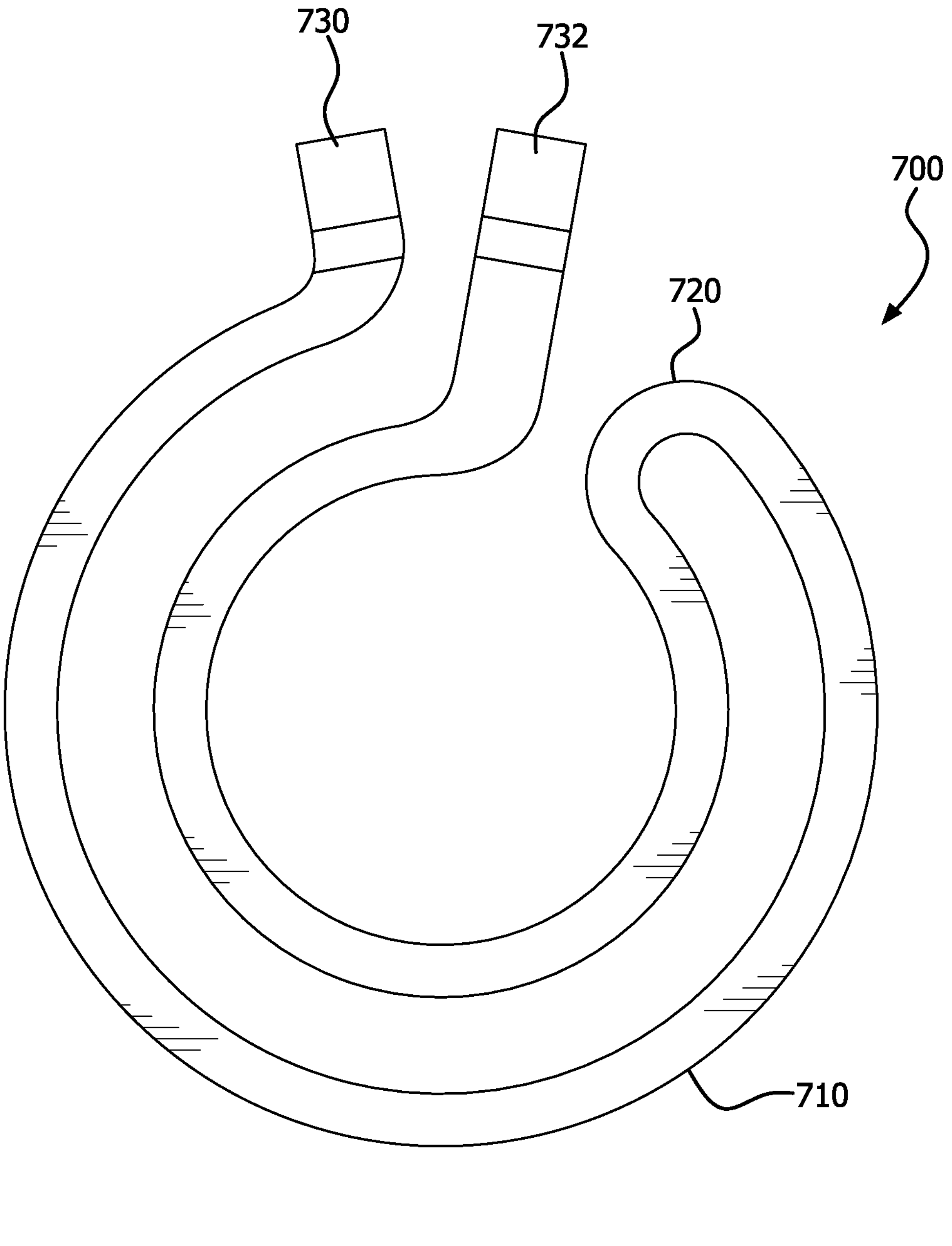
FIG. 7 is a plan view of a single turn resistive quench heater.
Figure 8:
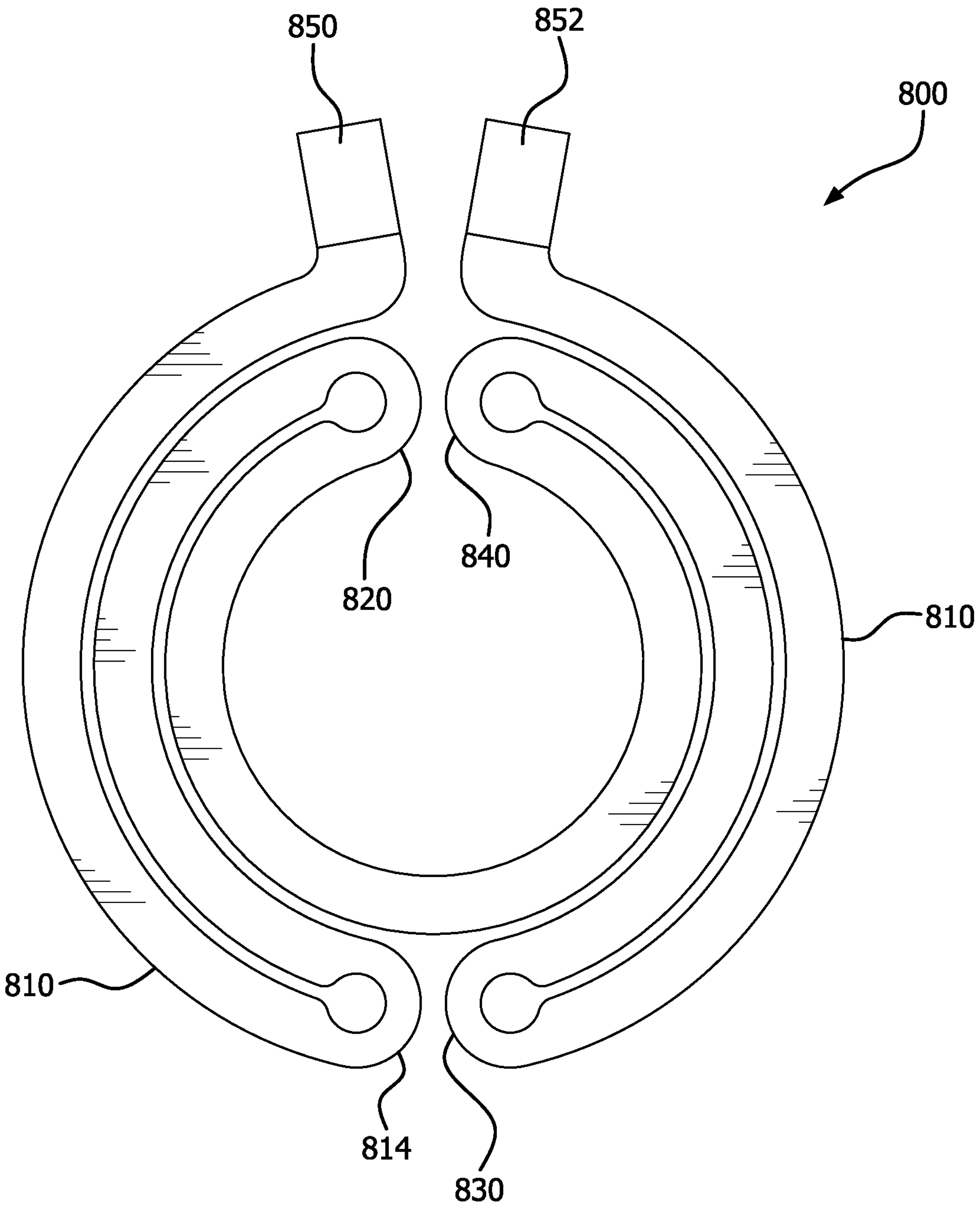
FIG. 8 is a plan view of a multiple turn resistive quench heater.

A single turn RQH 700 is shown in FIG. 7. The RQH 700 includes a elements 710 with a single turn 720 and electrical contacts 730, 732. A multiple turn RQH 800 is shown in FIG. 8. The multiple turn RQH 800 includes an element 810 with turns 814, 820, 830 and 840. Electrical contacts 850 and 852 connect the RQH 802 power.

There are indications from analysis that the resistive quench heaters (RQH) alone, without an additional end QIC, are sufficient to create the required quench avalanche in a time to result in adequate reduction of axial force. Therefore, in addition to embodiments that contain a combination of QIC plus RQH quench heaters, the invention includes embodiments that contain RQH alone without QIC in a symmetric about the midplane distribution in all coils in a multi-coil magnet.

The time interval from the activation of the resistive heaters to the quench resulting from the heaters is a principal parameter for the effectiveness of the symmetric quench produced by the heaters. A magnet was fabricated and a test conducted to measure this time interval. Conceptually, the design of the two coil REBCO pancake wound magnet is the same as that shown in FIG. 1. At the full design current of 315 A. The central field of the magnet was 25 T. The coils were wound of standard REBCO tape conductor and contained stainless steel co-wind in a construction that is representative of high field REBCO coil design. The coils of the test magnet were fitted with pairs of RQH which were symmetrically positioned at both sides of the coil midplane. The power supply for the RQH was a capacitor. The magnet system included active protection in the form of a quench detector that monitored the voltages of all modules, double pancakes, of the coils and logic to operate the switch and close the capacitor circuit in the event of an observed quench.

On the first ramp toward full current, the magnet experienced a spontaneous pre-mature quench at a current of 225 A. due to a local defect in the conductor in a portion of the winds away from the coil ends. The active quench protection circuitry operated as planned to detect the quench at a threshold level of 0.5 volts, closed the switch and immediately began the discharge of the capacitor power supply into the RQH circuit. Over a time interval, the heat generated by the heater element of the RQH diffuses into the windings and heats the adjacent pancake. The temperature of the pancake is increased through the critical temperature at which point the pancake quenches to begin the symmetric quench process. That time interval must be comparable to or shorter than the time interval for the development of a spontaneous quench if the symmetric quench is to be effective in reducing the quench axial force.

Since the magnet quenched prematurely at low current, the field was correspondingly low and the critical currents and critical temperatures in the winds were higher than if the magnet were at high field. The RQH were therefore required to heat the windings to higher temperature to create a quench than if the magnet were at full field. As a result, the test was a worst-case condition to measure the time interval for RQH performance. The measured time intervals from the activation of the RQH power supply to the initiation of rapid quench in the pancakes at the heater locations is given in Table 1:

TABLE 1

Quench time intervals for the initiation of quench by resistive quench heaters in the end regions of the two coils of the test magnet.

| | |
|---|---|
| Coil 1 top | 60 msec. |
| Coil 1 bottom | 75 msec. |
| Coil 2 top | 65 msec. |
| Coil 2 bottom | 45 msec. |

The times for induced quench from the RQH, as given in the table, are a worst case given the low current of the magnet at quench. These times are expected to be significantly reduced as the current in the magnet approaches full design current and the critical temperatures in the windings are correspondingly reduced. A comparison of the measured times for induced quench by the RQH with the time delays expected for the onset of spontaneous quench, as indicated above, show that the RQH can be effective in producing a symmetric quench for the reduction of quench axial forces in multi-coil magnets containing NI/RI coils.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A magnet comprising:

a stack of a plurality of superconducting pancake wound coils having an axis normal to a winding direction of the coils, the stack having axial ends and having a stack midplane relative to the axis;

a quench detector for detecting a quench in the stack of superconducting pancake wound coils; and, a plurality of resistance quench heaters (RQH) distributed symmetrically along the axis with respect to the stack midplane;

control circuitry for controlling the operation of the RQH upon the detection of a quench by the quench detector;

further comprising a quench initiation coil (QIC) at each axial end of the stack;

wherein the QIC has an operating current within ±30% of the operating current of the superconducting pancake wound coils.

2. The magnet of claim 1, wherein the QIC is pancake wound.

3. The magnet of claim 1, wherein the RQH comprises insulation, the insulation comprising at least one selected from the group consisting of Kapton and G10.

4. The magnet of claim 1, wherein the RQH comprises a high thermal conductivity electrical insulation to facilitate transfer of heat from the heater element.

5. The magnet of claim 1, wherein the superconducting pancake wound coils are no insulation resistive insulation (NI/RI) coils.

6. The magnet of claim 1, further comprising a power supply to drive at least one selected from the group consisting of a RQH and a QIC.

7. The magnet of claim 1, further comprising a processor for controlling, responsive to an input from the quench detector, at least one selected from the group consisting of an RQH, a QIC and a switch for external discharge.

8. The magnet of claim 1, wherein the symmetric distribution of groups of RQH are between adjacent pairs of superconducting pancake wound coils.

9. The magnet of claim 1, wherein RQH have at least one superconducting pancake wound coil positioned between the RQH and the axial ends of the stack.

10. The magnet of claim 1, further comprising an external dump resistor and a circuit.

11. A magnet comprising:

a stack of a plurality of superconducting pancake wound coils having an axis normal to a winding direction of the coils, the stack having axial ends and having a stack midplane relative to the axis;

a quench detector for detecting a quench in the stack of superconducting pancake wound coils; and, a plurality of resistance quench heaters (RQH) distributed symmetrically along the axis with respect to the stack midplane;

control circuitry for controlling the operation of the RQH upon the detection of a quench by the quench detector;

further comprising a quench initiation coil (QIC) at each axial end of the stack;

wherein the inductance of the QIC is within ±50% of the inductance of an adjacent superconducting pancake wound coil at an end of the coil stack.

12. The magnet of claim 11, wherein the QIC is pancake wound.

13. The magnet of claim 11, wherein the RQH comprises insulation, the insulation comprising at least one selected from the group consisting of Kapton® and G10.

14. The magnet of claim 11, wherein the RQH comprises high thermal conductivity electrical insulation to facilitate transfer of heat from the heater element.

15. The magnet of claim 11, wherein the superconducting pancake wound coils are no insulation resistive insulation (NI/RI) coils.

16. The magnet of claim 11, further comprising a power supply to drive at least one selected from the group consisting of a RQH and a QIC.

17. The magnet of claim 11, further comprising a processor for controlling, responsive to an input from the quench detector, at least one selected from the group consisting of an RQH, a QIC and a switch for external discharge.

18. The magnet of claim 11, wherein the symmetric distribution of groups of RQH are between adjacent pairs of superconducting pancake wound coils.

19. The magnet of claim 11, wherein RQH have at least one superconducting pancake wound coil positioned between the RQH and the axial ends of the stack.

20. The magnet of claim 11, further comprising an external dump resistor and circuit.

21. A magnet comprising:

a stack of a plurality of superconducting pancake wound coils having an axis normal to a winding direction of the coils, the stack having axial ends and having a stack midplane relative to the axis;

a quench detector for detecting a quench in the stack of superconducting pancake wound coils; and a plurality of resistance quench heaters (RQH) distributed symmetrically along the axis with respect to the stack midplane;

control circuitry for controlling the operation of the RQH upon the detection of a quench by the quench detector; and further comprising at least first and second pairs of RQH, each pair comprising first and second RQH symmetrically distributed with respect to the stack midplane, with at least one superconducting pancake wound coil between the first RQH of the first pair and the first RQH of the second pair, and with at least one superconducting pancake wound coil between the second RQH of the first pair and the second RQH of the second pair.

22. The magnet of claim 21, further comprising a quench initiation coil (QIC) at each axial end of the stack.

23. The magnet of claim 21, wherein the QIC is pancake wound.

24. The magnet of claim 21, wherein the RQH comprises insulation, the insulation comprising at least one selected from the group consisting of Kapton® and G10.

25. The magnet of claim 21, wherein the RQH comprises high thermal conductivity electrical insulation to facilitate transfer of heat from the heater element.

26. The magnet of claim 21, wherein the superconducting pancake wound coils are no insulation resistive insulation (NI/RI) coils.

27. The magnet of claim 21, further comprising a power supply to drive at least one selected from the group consisting of a RQH and a QIC.

28. The magnet of claim 21, further comprising a processor for controlling, responsive to an input from the quench detector, at least one selected from the group consisting of an RQH, a QIC and a switch for external discharge.

29. The magnet of claim 21, wherein the symmetric distribution of groups of RQH are between adjacent pairs of superconducting pancake wound coils.

30. The magnet of claim 21, wherein RQH have at least one superconducting pancake wound coil positioned between the RQH and the axial ends of the stack.

31. The magnet of claim 21, further comprising an external dump resistor and circuit.

32. A method of quenching a magnet comprising a stack of a plurality of superconducting pancake wound coils having an axis normal to a winding direction of the coils, the stack having axial ends and having a stack midplane relative to the axis, the method comprising the steps of:

providing a quench detector for detecting a quench in the stack of superconducting coils;

providing a plurality of resistance quench heaters (RQH) distributed within the stack symmetrically along the axis with respect to the stack midplane;

detecting a quench with the quench detector; and using control circuitry to control the operation of the RQH upon the detection of the quench by the quench detector to symmetrically quench the stack of a plurality of superconducting pancake wound coils relative to the stack midplane; and, further comprising the step of, after detection of a quench by the quench detector, using control circuitry to open an external discharge switch to direct current from the stack of a plurality of superconducting pancake wound coils through an external discharge circuit and dump resistor.

33. The method of claim 32, wherein the control circuitry activates the power supply for at least one selected from the group consisting of the RQH and a QIC.

* * * * *